(12) United States Patent
Kim et al.

(10) Patent No.: US 11,274,713 B2
(45) Date of Patent: Mar. 15, 2022

(54) MEAN RATE DECISION METHOD FOR CLUTCH MOTOR

(71) Applicant: Hyundai Kefico Corporation, Gunpo-si (KR)

(72) Inventors: Nam Hun Kim, Seoul (KR); Min Hyo Kim, Gwangju-si (KR); Chang Min Cho, Seoul (KR)

(73) Assignee: Hyundai Kefico Corporation, Gunpo-si (KR)

( * ) Notice: Subject to any disclaimer, the term of this patent is extended or adjusted under 35 U.S.C. 154(b) by 0 days.

(21) Appl. No.: 17/114,770

(22) Filed: Dec. 8, 2020

(65) Prior Publication Data

US 2021/0180656 A1  Jun. 17, 2021

(30) Foreign Application Priority Data

Dec. 13, 2019 (KR) ........................ 10-2019-0166393

(51) Int. Cl.
| | |
|---|---|
| *F16D 48/08* | (2006.01) |
| *F16D 28/00* | (2006.01) |
| *F16D 48/06* | (2006.01) |
| *F16D 48/10* | (2006.01) |

(52) U.S. Cl.
CPC ............ *F16D 48/08* (2013.01); *F16D 28/00* (2013.01); *F16D 48/068* (2013.01); *F16D 48/10* (2013.01); *F16D 2500/302* (2013.01); *F16D 2500/3026* (2013.01); *F16D 2500/3067* (2013.01); *F16D 2500/30806* (2013.01); *F16D 2500/3108* (2013.01); *F16D 2500/3144* (2013.01); *F16D 2500/31413* (2013.01); *F16D 2500/31466* (2013.01); *F16D 2500/501* (2013.01); *F16D 2500/5114* (2013.01); *F16D 2500/7041* (2013.01)

(58) Field of Classification Search
None
See application file for complete search history.

(56) References Cited

U.S. PATENT DOCUMENTS

2008/0125285 A1  5/2008 Takeuchi

FOREIGN PATENT DOCUMENTS

| EP | 3208481 A1 * | 8/2017 | ........... F16D 48/064 |
|---|---|---|---|
| JP | 1998-0112901 A | 4/1998 | |
| JP | 2004-0044666 A1 | 2/2004 | |
| JP | 2008-132868 A | 6/2008 | |

(Continued)

*Primary Examiner* — Timothy Hannon
(74) *Attorney, Agent, or Firm* — Morgan, Lewis & Bockius LLP

(57) ABSTRACT

A mean rate decision method for a clutch motor is disclosed. The method includes determining whether the clutch motor and a gear sensor are in an electrical failure state; when it is determined the clutch motor and the gear sensor are not in the electrical failure state, determining whether there is a driver's starting intention on the basis of state information on the clutch pedal; setting a target position of the clutch motor according to a pedal setting value set by the clutch pedal; and when it is determined that there is no driver's starting intention and that an actual position of the clutch motor exceeds the target position of the clutch motor, determining a failure of the clutch motor on the basis of an excess movement amount and an excess duration in the excess state.

13 Claims, 5 Drawing Sheets

(56) References Cited

FOREIGN PATENT DOCUMENTS

| | | | |
|---|---|---|---|
| JP | 2014-0092226 A | 5/2014 |
| KR | 10-1996-0040785 A | 12/1996 |
| KR | 10-2004-0090074 A | 10/2004 |
| KR | 10-0705948 B1 | 4/2007 |
| KR | 10762886 B1 | 9/2007 |
| KR | 2019-0080260 A | 7/2009 |
| KR | 101198788 B1 | 11/2012 |
| KR | 2019-0041829 A | 4/2019 |
| KR | 10-2019-0072803 A | 6/2019 |
| WO | WO 2017/142046 A1 | 8/2017 |

\* cited by examiner

MEAN RATE DECISION METHOD FOR CLUTCH MOTOR

CROSS REFERENCE TO RELATED APPLICATIONS

The present application claims priority to Korean Patent Application No. 10-2019-0166393 filed Dec. 13, 2019, the entire contents of which is incorporated herein for all purposes by this reference.

BACKGROUND OF THE INVENTION

Field of the Invention

The present disclosure relates to a mean rate decision method for a clutch motor and, more particularly, to a mean rate decision method for a clutch motor driving a clutch, in a system configured so that the clutch is driven by a transmission control unit (TCU) by electrically receiving a signal from a clutch pedal.

Description of the Related Art

The intelligent manual transmission (iMT) to which the technology of the present disclosure is applied is a system configured so that a clutch pedal and a clutch are not mechanically connected and the clutch is driven by a transmission control unit (TCU) by electrically receiving a signal from the clutch pedal.

The clutch is generally controlled in such a manner as to be operated by a driver's clutch pedal operation. When the driving assistance system is operated, the transmission control unit (TCU) can control the clutch, whereby there are advantages of driving convenience and fuel efficiency improvement.

However, the clutch may malfunction due to an electrical problem of the clutch motor driving the clutch. In addition, the clutch may malfunction due to an electrical problem of the gear sensor.

When the vehicle controller does not detect such failures, an unintentional starting of the vehicle may occur.

Therefore, there is a need for a technology configured to be capable of solving the above-mentioned problems according to the related art.

DOCUMENTS OF RELATED ART

Patent Document 1

Korean Publication No. 10-2019-0041829 (Apr. 23, 2019)

SUMMARY OF THE INVENTION

The present disclosure has been made to solve the above problems, and it is an objective of the present disclosure to provide a mean rate decision method for a clutch motor, the method being configured to be capable of accurately determining a failure of the clutch motor in order to prevent unintentional starting of the vehicle occurring when the vehicle controller does not accurately detect the failure of the clutch motor.

According to one aspect of the present disclosure, a mean rate decision method for a clutch motor driving a clutch, in a system configured so that the clutch is driven by a transmission control unit (TCU) by electrically receiving a signal from a clutch pedal, includes determining whether the clutch motor and a gear sensor are in an electrical failure state; when it is determined the clutch motor and the gear sensor are not in the electrical failure state, determining whether there is a driver's starting intention on the basis of state information on the clutch pedal; setting a target position of the clutch motor according to a pedal setting value set by the clutch pedal; and when it is determined that there is no driver's starting intention and that an actual position of the clutch motor exceeds the target position of the clutch motor, determining a failure of the clutch motor on the basis of an excess movement amount and an excess duration in the excess state.

Preferably, in the determining whether the clutch motor and the gear sensor are in the electrical failure state, when the clutch motor drives abnormally or the gear shift sensor operates abnormally, an entire logic for the mean rate decision method of the clutch motor may be not performed.

In addition, in the determining whether the clutch motor and the gear sensor are in the electrical failure state, by using a select position sensor that detects left and right movements of a shift gear lever, and a shift position sensor that detects vertical movements of the shift gear lever, when sensing data detected from the select position sensor and the shift position sensor indicates information on a position where the shift gear lever is not capable of moving, the clutch motor and the gear sensor may be determined to be in the electrical failure state.

In addition, in the determining whether the clutch motor and the gear sensor are in the electrical failure state, when information on a current position of the clutch motor detected using a clutch motor position sensor that detects the current position of the clutch motor is different from information on an actual driving position of the clutch motor, the clutch motor and the gear sensor may be determined to be in the electrical failure state.

Preferably, in the determining whether there is the driver's starting intention, the state information on the clutch pedal may include information on an absolute position of the clutch pedal and information on a current inclination of the clutch pedal.

Herein, the determining whether there is a driver's starting intention may be performed on the basis of whether the absolute position of the clutch pedal is equal to or higher than a predetermined reference value, whether the current inclination of the clutch pedal is equal to or higher than a predetermined reference value, and whether an accelerator position sensor (APS) value is equal to or higher than a predetermined reference value.

Preferably, the mean rate decision method for the clutch motor may further include, after determining whether there is a driver's starting intention, determining whether the vehicle is in a state of being capable of being started on the basis of the state information of the vehicle. When it is determined that the vehicle is in the state of being capable of being started, the determining of the failure of the clutch motor may be performed.

Herein, the state information of the vehicle may include information on a gear engagement state, information on an engine operation state, and information on a vehicle speed.

Herein, the determining whether the vehicle is in a state of being capable of being started may be performed on the basis of whether a gear position sensing value detected from the shift gear sensor is same as an actual position of the shift gear lever, whether an engine speed value detected from an engine sensor is same as an actual speed of an engine, whether a vehicle speed value detected from a speed sensor of the vehicle is same as an actual speed of the vehicle.

Herein, the setting of the target position of the clutch motor may include detecting a pedal setting value set by the clutch pedal and detecting a current position of the clutch motor to compare the detected values with each other; setting the target position of the clutch motor as the pedal setting value when the pedal setting value is higher than the current position of the clutch motor; and setting the target position of the clutch motor as the current position of the clutch motor when the pedal setting value is less than or equal to the current position of the clutch motor.

Preferably, the determining of the failure of the clutch motor may include, after detecting the current position of the clutch motor, determining whether the detected position exceeds the target position of the clutch motor; determining whether an excess movement amount of the current position of the clutch motor exceeds an allowable reference value; and when the excess movement amount exceeds the allowable reference value, performing control in such a manner as to enter a safety mode.

Herein, the determining whether the excess movement amount of the current position of the clutch motor exceeds the allowable reference value may be performed by determining whether an increase amount (dPos) in the current position of the clutch motor exceeds a predetermined reference value during a predetermined time (dT).

In addition, in the determining whether the excess movement amount of the current position of the clutch motor exceeds the allowable reference value, when the excess movement amount does not exceed the allowable reference value, the target position and determination time of the clutch motor are initialized.

According to the present disclosure, since the mean rate decision method for the clutch motor includes the electrical failure determination step, the driver's starting intention determination step, the clutch motor target position setting step, and the clutch motor failure determination step, it is possible to accurately determine a failure of the clutch motor and thus prevent an unintentional starting of the vehicle.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
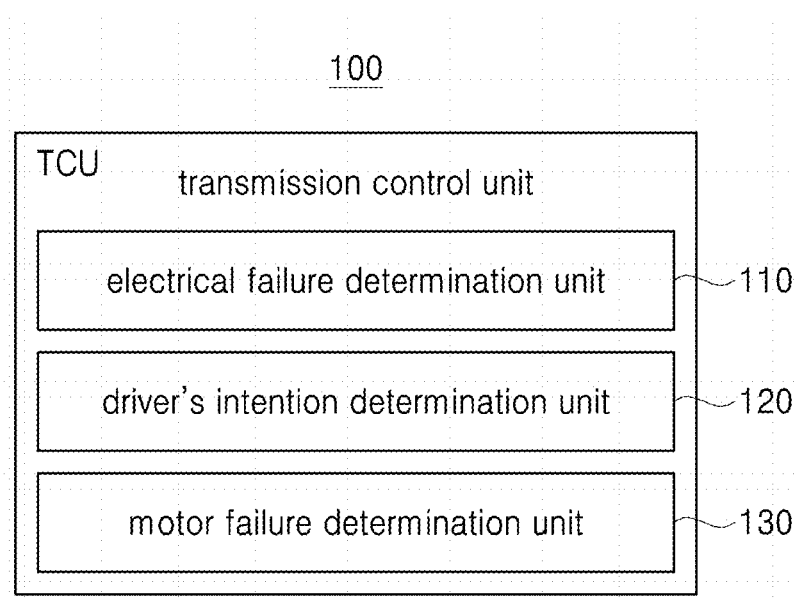
FIG. 1 is a block diagram illustrating a transmission control unit to which a mean rate decision method for a clutch motor is applied according to an embodiment of the present disclosure.

Hereinafter, a preferred embodiment of the present disclosure will be described in detail.

In describing the present disclosure, terms used in the following specification are only used to describe specific embodiments, and are not intended to limit the present disclosure. Singular expressions include plural expressions unless the context clearly indicates otherwise.

In addition, it is to be understood that terms such as "include" or "have" in the present specification are intended to designate the existence of features, numbers, steps, actions, components, parts, or combinations thereof described in the specification, but not to preclude the possibility of the presence or addition of one or more other features or numbers, steps, actions, components, parts, or combinations thereof.

In addition, terms such as first and second may be used to describe various components, but the components should not be limited by the terms. These terms are used only for the purpose of distinguishing one component from another component.

In addition, terms such as " . . . part", " . . . unit", and " . . . module" described in the specification mean a unit that processes at least one function or operation, and the unit may be implemented by hardware, software, or a combination of hardware and software.

In the description with reference to the accompanying drawings, the same drawing reference numerals are assigned to the same elements, and duplicate descriptions of the same elements will be omitted. In addition, in describing the present disclosure, when it is determined that a detailed description of a related known technology may unnecessarily obscure the subject matter of the present disclosure, a detailed description thereof will be omitted.

Figure 2:
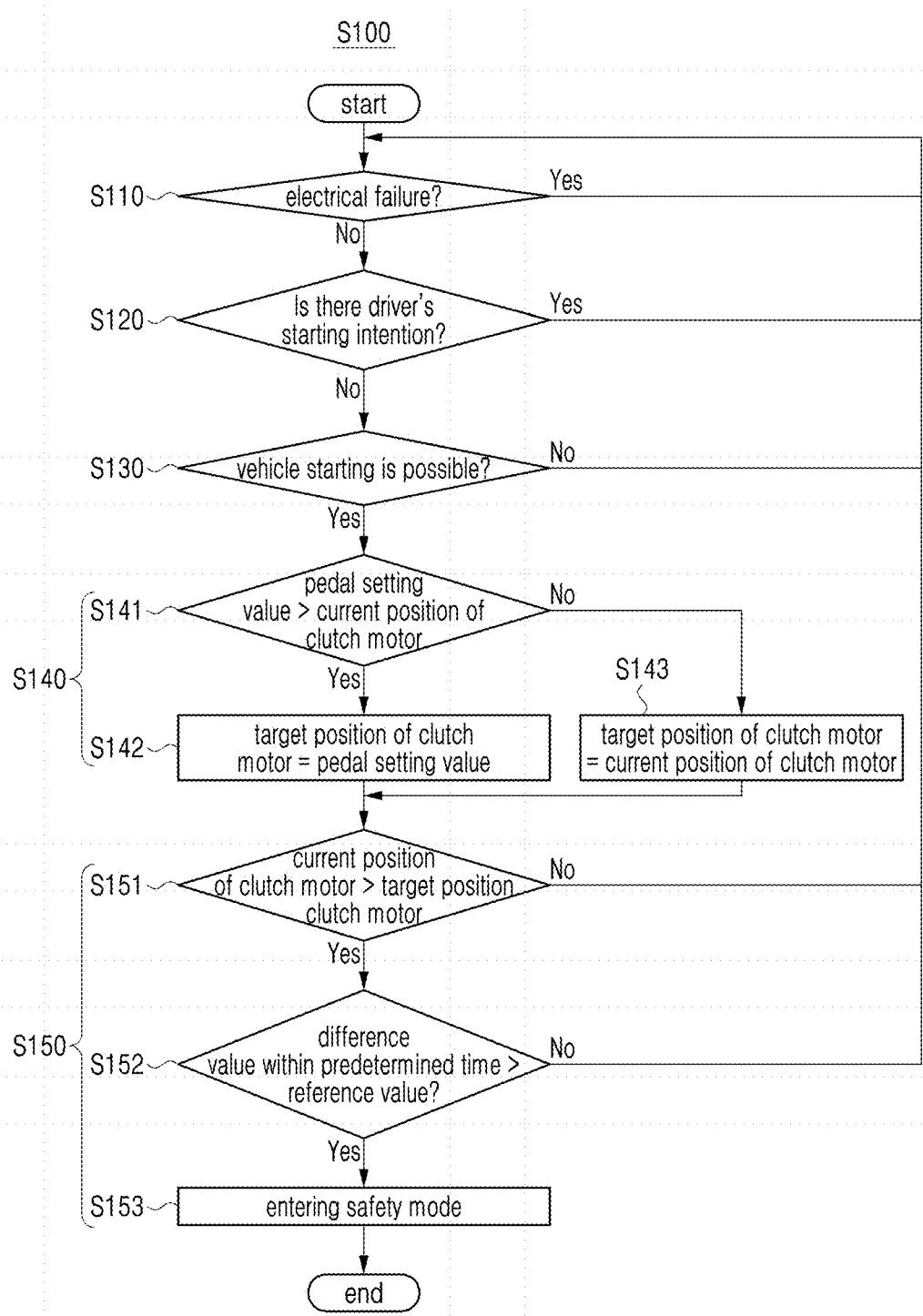
FIG. 2 is a flow chart illustrating a mean rate decision method for a clutch motor according to an embodiment of the present disclosure.

FIG. 1 is a block diagram illustrating a transmission control unit to which a mean rate decision method for a clutch motor according to an embodiment of the present disclosure is applied; and FIG. 2 is a flow chart illustrating a mean rate decision method for a clutch motor according to an embodiment of the present disclosure.

Referring to FIG. 1 and FIG. 2, a mean rate decision method S100 for a clutch motor according to an embodiment of the present disclosure may be stored in a form of program in a transmission control unit (TCU) 100 and thus driven. Herein, the transmission control unit 100 includes an electrical failure determination unit 110, a driver's intention determination unit 120, and a motor failure determination unit 130. Herein, the transmission control unit 100 may electrically receive a signal from the clutch pedal and drive the clutch using the clutch motor.

Hereinafter, the mean rate decision method S100 for the clutch motor according to the present embodiment will be described in detail.

As shown in FIG. 2, the mean rate decision method S100 for the clutch motor according to the present embodiment includes an electrical failure determination step S110 of performing a specific process, a driver's starting intention-determination step S120, and a vehicle starting possibility-determination step S130, a clutch motor target position setting step S140, and a clutch motor failure determination step S150.

In the electrical failure determination step S110, it is determined whether the clutch motor or a gear sensor is in an electrical failure state. Herein, when it is determined not to be in the electrical failure state, the driver's starting intention determination step S120 is performed. Meanwhile, when the clutch motor drives abnormally or the gear shift sensor operates abnormally, it is preferable that the entire logic regarding the mean rate decision method for the clutch motor is not performed.

The above-mentioned electrical failure state is determined using a select position sensor and a shift position sensor. Herein, the select position sensor is a sensor that detects the left and right movements of the shift gear lever. In addition, the shift position sensor is a sensor that detects the vertical movements of the shift gear lever. When the sensing data detected from the select position sensor and the shift position sensor indicates information about the position where the shift gear lever is not capable of moving, it is determined to be in the electrical failure state.

In addition, the electric failure state may be determined by using a clutch motor position sensor. When the current position information of the clutch motor detected using the clutch motor position sensor that detects the current position of the clutch motor is different from an actual driving position of the clutch motor, it is determined to be in the electrical failure state.

In the driver's starting intention determination step S120, it is determined whether there is a driver's starting intention on the basis of state information on the clutch pedal. When it is determined that there is no driver's starting intention, the clutch motor failure determination step S150 is performed.

Herein, the state information about the clutch pedal includes absolute position information of the clutch pedal and current inclination information of the clutch pedal. The driver's starting intention is determined on the basis of whether the absolute position of the clutch pedal is equal to or higher than a predetermined reference value, whether the current inclination of the clutch pedal is equal to or higher than a predetermined reference value, and whether an accelerator position sensor (APS) value is equal to or higher than a predetermined reference value.

When any one of the above-mentioned conditions is satisfied, it may be determined that there is no driver's starting intention. For example, when the absolute position of the clutch pedal is equal to or higher than the predetermined reference value, when the current inclination of the clutch pedal is equal to or higher than the predetermined reference value, or when the accelerator position sensor (APS) value is equal to or higher than the predetermined reference value, it may be determined that there is no driver's starting intention.

Meanwhile, after the driver's starting intention determination step S120 is performed, it is determined whether the vehicle is in a state being capable of being started on the basis of the state information of the vehicle in the vehicle starting possibility determination step S130. The clutch motor failure determination step S150 is performed only when the vehicle is in a state being capable of being started.

Herein, the vehicle state information is information on a gear engagement state, information on an engine operation state, and information on a vehicle speed. Specifically, it may be determined whether the vehicle is in a state being capable of being started, on the basis of whether a gear position sensing value detected from the shift gear sensor is same as an actual position of the shift gear lever, whether an engine speed value detected from an engine sensor is same as an actual speed of the engine, and whether a vehicle speed value detected from the vehicle speed sensor is same as an actual speed of the vehicle.

When all of the above-mentioned conditions are satisfied, it may be determined that the vehicle is in a state being capable of being started. For example, it may be determined that the vehicle is in a state being capable of being started, only when the gear position sensing value detected from the shift gear sensor is same as the actual position of the shift gear lever, the engine speed value detected from the engine sensor is same as the actual speed of the engine, and the vehicle speed value detected from the vehicle speed sensor is same as the actual speed of the vehicle.

In the clutch motor target position setting step S140, the target position of the clutch motor is set according to the pedal setting value set by the clutch pedal.

As shown in FIG. 2, the clutch motor target position setting step S140 may include a pedal setting value comparison step S141, a first setting step S142, and a second setting step S143.

In the pedal setting value comparison step S141, the pedal setting value set by the clutch pedal is detected, the current position of the clutch motor is detected, and then the detected values are compared with each other.

Herein, when the pedal setting value is larger than the current position of the clutch motor, the first setting step S142 is performed in which the target position of the clutch motor is set to the pedal setting value. Meanwhile, when the pedal setting value is less than or equal to the current position of the clutch motor, the second setting step S143 is performed in which the target position of the clutch motor is set to the current position of the clutch motor.

In other words, the larger of the pedal setting value and the current position of the clutch motor is selected as the target position of the clutch motor.

Finally, in the clutch motor failure determination step S150, when an actual position of the clutch motor exceeds the target position of the clutch motor, the clutch motor failure is determined on the basis of an excess movement amount and an excess duration in the excess state.

The clutch motor failure determination step S150 according to the present embodiment may include a clutch motor starting direction motion detection step S151, an in time-movement amount check step S152, and a safety mode entry step S153.

Specifically, in the clutch motor starting direction motion detection step S151, after detecting the current position of the clutch motor, it is determined whether the detected current position exceeds the target position of the clutch motor.

Figure 3:
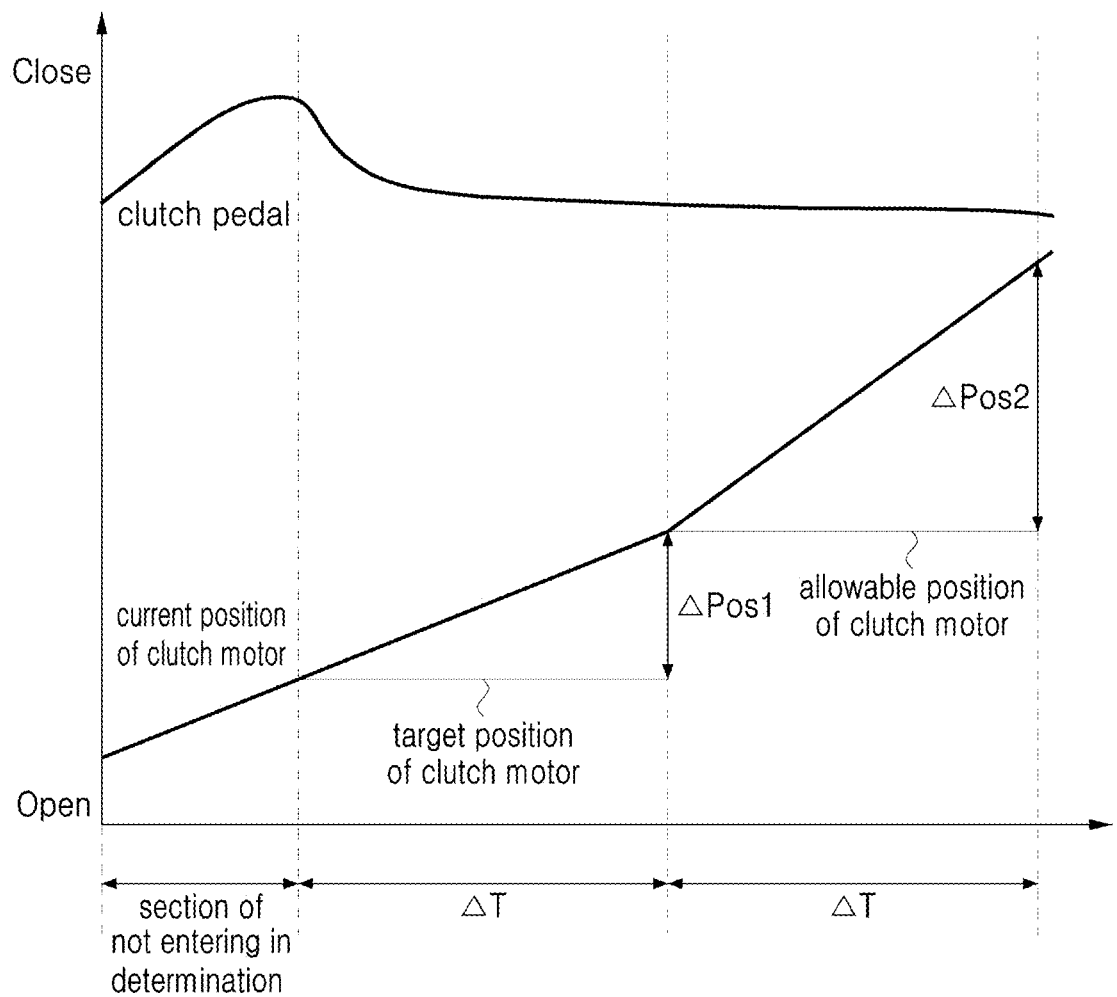
FIG. 3 is a graph illustrating the position of the clutch pedal and the current position of the clutch motor over time.

Thereafter, the in-time movement amount check step S152 is performed, in which it is determined whether an excess movement amount of the current position of the clutch motor exceeds an allowable reference value. Specifically, it is determined whether increase amounts dPos1 and dPos2 in the position of the clutch motor exceed a predetermined reference value during a predetermined time dT, as shown in FIG. 3.

When the excess movement amount of the current position exceeds the allowable reference value in the in-time movement amount check step S152, the safety mode entry step S153 is performed in such a manner as to enter the safety mode.

Meanwhile, when the excess movement amount of the current position does not exceed the allowable reference value in the in-time movement amount check step S152, it is preferable to initialize the target position and determination time of the clutch motor.

Figure 4:
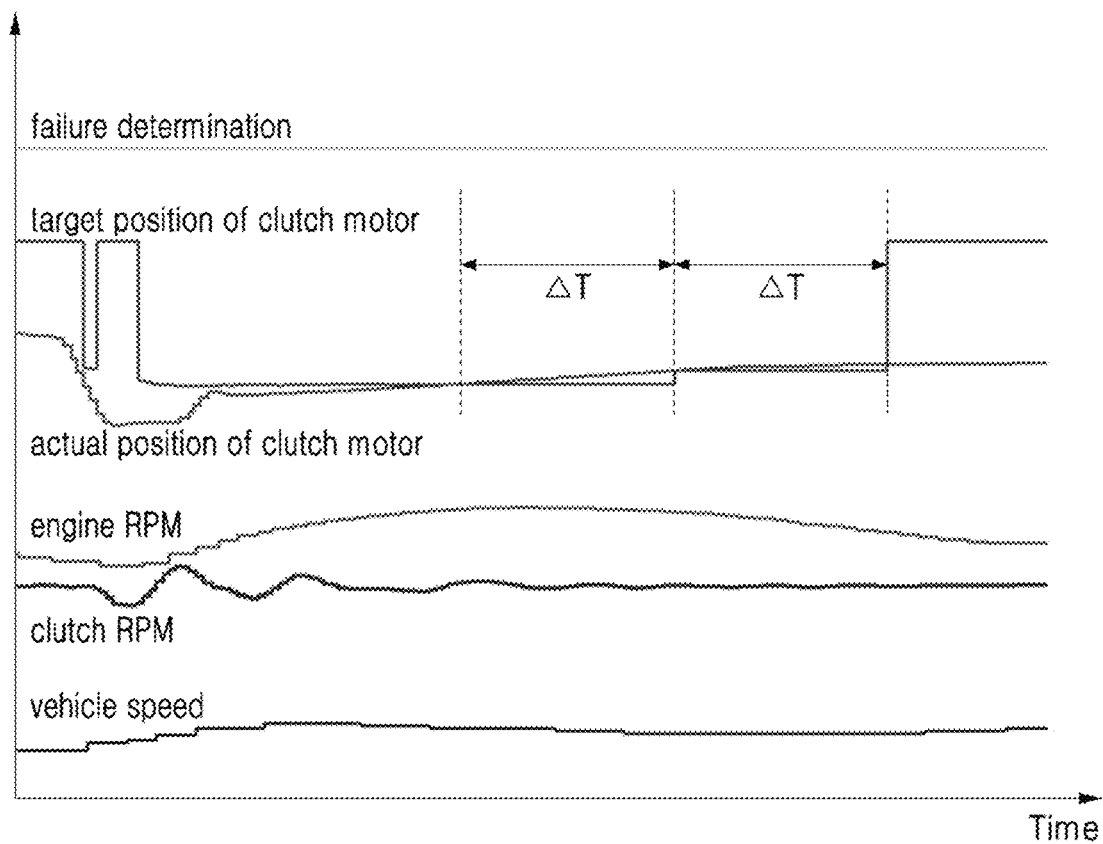
FIG. 4 is a graph illustrating the target position of the clutch motor and the actual position of the clutch motor when the driving assistance system is operated.

As shown in FIG. 4, when the driving assistance system operates, an actual position of the clutch motor may move in a direction opposite to the driver's intention. However, it does not cause a sudden starting of the vehicle. In this situation, the actual position of the clutch motor increases with a small inclination, so that the mean rate decision method S100 for the clutch motor according to the present disclosure determines that the clutch motor is not in a state of failure.

Figure 5:
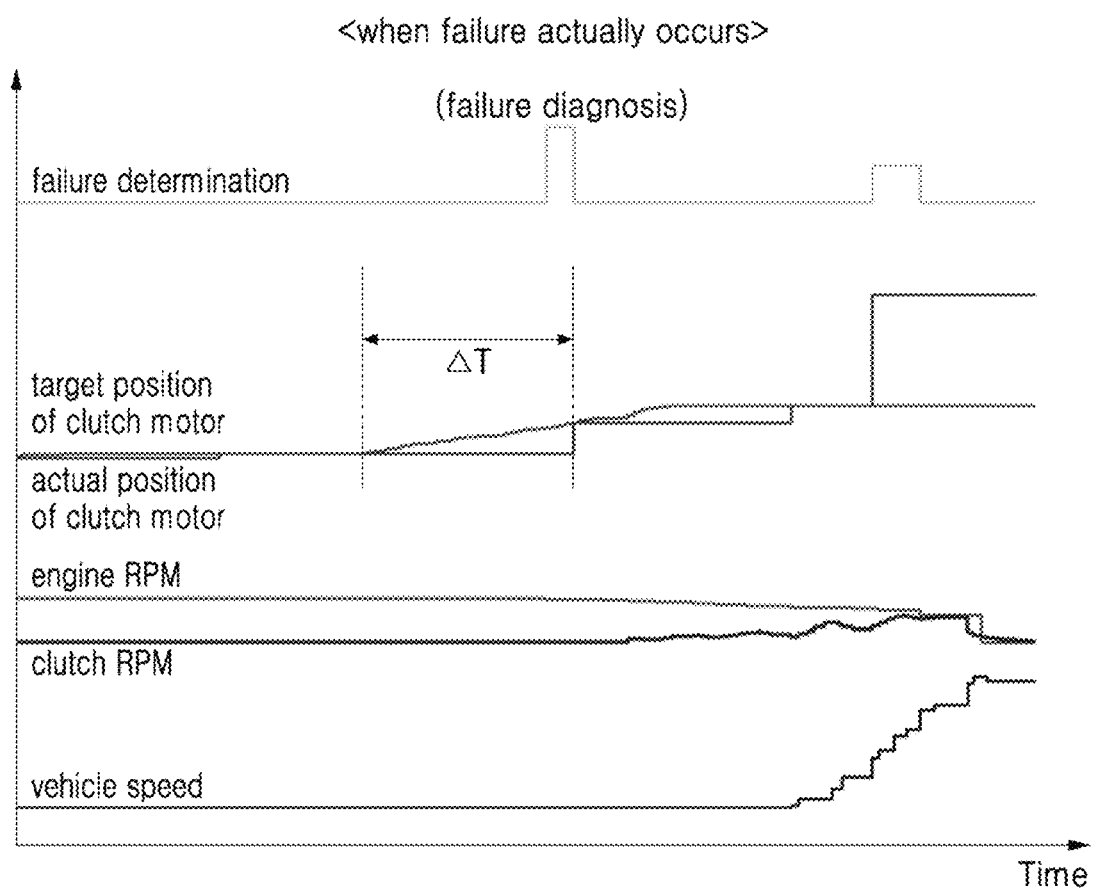
FIG. 5 is a graph illustrating the target position of the clutch motor and the actual position of the clutch motor when a failure occurs in the clutch motor.

In addition, as shown in FIG. 5, when a failure actually occurs, a sudden starting of the vehicle may occur. Herein, the actual position of the clutch motor increases with a large inclination. The mean rate decision method S100 for the clutch motor according to the present disclosure performs control in such a manner as to determine a failure of the clutch motor and enter the safety mode, thereby improving the driver's safety.

As mentioned above, the clutch may malfunction due to an electrical problem of the clutch motor that drives the clutch according to the related art. In addition, the clutch may malfunction due to an electrical problem of the gear sensor. When the vehicle controller does not detect such failures, an unintentional stating of the vehicle may occur.

According to the present disclosure, the mean rate decision method for the clutch motor includes the electrical failure determination step S110, the driver's starting intention determination step S120, the clutch motor target position setting step S140, and the clutch motor failure determination step S150, whereby it is possible to accurately determine a failure of the clutch motor and prevent an unintentional starting of the vehicle.

In the above detailed description of the present disclosure, only specific embodiments according thereto have been described. However, it is to be understood that the present disclosure is not limited to the special form mentioned in the detailed description, but to include all modifications, equivalents, and substitutes within the spirit and scope of the present disclosure as defined by the appended claims.

The invention claimed is:

1. A mean rate decision method for a clutch motor driving a clutch, in a system configured so that the clutch is driven by a transmission control unit (TCU) by electrically receiving a signal from a clutch pedal, the method comprising:
    determining whether the clutch motor and a gear sensor are in an electrical failure state (S110);
    when it is determined the clutch motor and the gear sensor are not in the electrical failure state, determining whether there is a driver's starting intention on the basis of state information on the clutch pedal (S120);
    setting a target position of the clutch motor according to a pedal setting value set by the clutch pedal (S140); and
    when it is determined that there is no driver's starting intention and that an actual position of the clutch motor exceeds the target position of the clutch motor, determining a failure of the clutch motor on the basis of an excess movement amount and an excess duration in an excess state (S150).

2. The method of claim 1, wherein in the determining whether the clutch motor and the gear sensor are in the electrical failure state (S100), when the clutch motor drives abnormally or the gear shift sensor operates abnormally, an entire logic for the mean rate decision method of the clutch motor is not performed.

3. The method of claim 2, wherein in the determining whether the clutch motor and the gear sensor are in the electrical failure state (S110), by using a select position sensor that detects left and right movements of a shift gear lever, and a shift position sensor that detects vertical movements of the shift gear lever, when sensing data detected from the select position sensor and the shift position sensor indicates information on a position where the shift gear lever is not capable of moving, the clutch motor and the gear sensor are determined to be in the electrical failure state.

4. The method of claim 2, wherein in the determining whether the clutch motor and the gear sensor are in the electrical failure state (S110), when information on a current position of the clutch motor detected using a clutch motor position sensor that detects the current position of the clutch motor is different from information on an actual driving position of the clutch motor, the clutch motor and the gear sensor are determined to be in the electrical failure state.

5. The method of claim 1, wherein in the determining whether there is the driver's starting intention (S120), the state information on the clutch pedal includes information on an absolute position of the clutch pedal and information on a current inclination of the clutch pedal.

6. The method of claim 5, wherein the determining whether there is the driver's starting intention (S120) is performed on the basis of whether the absolute position of the clutch pedal is equal to or higher than a predetermined reference value, whether the current inclination of the clutch pedal is equal to or higher than a predetermined reference value, and whether an accelerator position sensor (APS) value is equal to or higher than a predetermined reference value.

7. The method of claim 1, further comprising:
    after determining whether there is the driver's starting intention (S120), determining whether the vehicle is in a state of being capable of being started on the basis of the state information of the vehicle (S130),
    wherein when it is determined that the vehicle is in the state of being capable of being started, the determining of the failure of the clutch motor (S150) is performed.

8. The method of claim 7, wherein the state information of the vehicle includes information on a gear engagement state, information on an engine operation state, and information on a vehicle speed.

9. The method of claim 7, wherein the determining whether the vehicle is in a state of being capable of being started (S130) is performed on the basis of whether a gear position sensing value detected from a shift gear sensor is same as an actual position of a shift gear lever, whether an engine speed value detected from an engine sensor is same as an actual speed of an engine, whether a vehicle speed value detected from a speed sensor of the vehicle is same as an actual speed of the vehicle.

10. The method of claim 1, wherein the setting of the target position of the clutch motor (S140) comprises:
    detecting a pedal setting value set by the clutch pedal and detecting a current position of the clutch motor to compare the detected values with each other (S141);
    setting the target position of the clutch motor as the pedal setting value when the pedal setting value is higher than the current position of the clutch motor (S142); and
    setting the target position of the clutch motor as the current position of the clutch motor when the pedal setting value is less than or equal to the current position of the clutch motor (S143).

11. The method of claim 1, wherein the determining of the failure of the clutch motor (S150) comprises:
    after detecting the current position of the clutch motor, determining whether the detected position exceeds the target position of the clutch motor (S151);
    determining whether an excess movement amount of the current position of the clutch motor exceeds an allowable reference value (S152); and
    when the excess movement amount exceeds the allowable reference value, performing control in such a manner as to enter a safety mode (S153).

12. The method of claim 11, wherein the determining whether the excess movement amount of the current position of the clutch motor exceeds the allowable reference value (S152) is performed by determining whether an increase amount (dPos) in the current position of the clutch motor exceeds a predetermined reference value during a predetermined time (dT).

13. The method of claim 11, wherein in the determining whether the excess movement amount of the current position of the clutch motor exceeds the allowable reference value (S152), when the excess movement amount does not exceed the allowable reference value, the target position and determination time of the clutch motor are initialized.

* * * * *